(12) United States Patent
Campanile et al.

(10) Patent No.: US 10,582,721 B2
(45) Date of Patent: Mar. 10, 2020

(54) AROMA COMPOSITION INCLUDING 2,4-NONADIENE

(71) Applicant: Givaudan S.A., Vernier (CH)

(72) Inventors: Fabio Campanile, Zollikerberg (CH); Hans Rudolph Gygax, Bal-Ragaz (CH); Harry Renes, Lelystad (NL); Sophie Davodeau, Amsterdam (NL)

(73) Assignee: GIVAUDAN S.A., Vernier (CH)

( * ) Notice: Subject to any disclaimer, the term of this patent is extended or adjusted under 35 U.S.C. 154(b) by 483 days.

(21) Appl. No.: 13/748,021

(22) Filed: Jan. 23, 2013

(65) Prior Publication Data

US 2013/0129893 A1    May 23, 2013

Related U.S. Application Data

(63) Continuation-in-part of application No. PCT/EP2011/063439, filed on Aug. 4, 2011.

(30) Foreign Application Priority Data

Aug. 4, 2010 (GB) .................................. 1013087.0

(51) Int. Cl.
*A23L 27/00* (2016.01)
*A23L 27/26* (2016.01)
*A23L 27/20* (2016.01)

(52) U.S. Cl.
CPC ............. *A23L 27/88* (2016.08); *A23L 27/202* (2016.08); *A23L 27/26* (2016.08)

(58) Field of Classification Search
CPC .................................................. A23L 1/22091
See application file for complete search history.

(56) References Cited

U.S. PATENT DOCUMENTS

| | | | | |
|---|---|---|---|---|
| 3,600,192 A * | 8/1971 | Sato | ...................... | A23L 7/1965 426/438 |
| 6,312,672 B1 * | 11/2001 | Coolbaugh | .............. | A61K 8/90 424/400 |
| 6,335,047 B1 | 1/2002 | Daniher et al. | | |
| 6,451,366 B1 * | 9/2002 | Daniher et al. | ................ | 426/534 |
| 8,415,428 B2 * | 4/2013 | Shimizu | .............. | C08F 297/046 525/63 |
| 8,772,415 B2 * | 7/2014 | Kusanose | ................. | C08F 8/04 521/148 |

FOREIGN PATENT DOCUMENTS

| JP | 2002-180080 | 6/2002 |
|---|---|---|
| WO | WO 01/32136 A1 | 5/2001 |
| WO | WO 2012/017032 A1 | 2/2012 |

OTHER PUBLICATIONS

STIC Search for 2,4-nondiene as an aroma compound.*
Chaiseri et al. "Aroma Compounds of Flash-Fried Rice". Kasetsart J. (Nat. Sci.) 45:717-729 (2011).*
PCT/EP2011/063439—International Search Report, dated Nov. 29, 2011.
PCT/EP2011/063439—International Written Opinion, dated Nov. 29, 2011.
Parchem Fine & Specialty Chemicals Internet Web Page (printed pages) http://www.parchem.com/chemical-supplier-distributor/-E.E--2,4-nonadiene-008802.aspx; accessed Nov. 19, 2010.
The Good Scents Company Internet Web Page (printed pages) http://www.thegoodscentscompany.com; accessed Oct. 22, 2010.
Servili, M. et al.,"Headspace Composition of Virgin Olive Oil Evaluated by Solid Phase Microextraction: Relationships With the Oil Sensory Characteristics", Food Flavors and Chemistry:Advances of the New Millenium, 2001, pp. 236-247.
Umano, K., et al., "Analysis of Headspace Volatiles from Overheated Beef Fat", Journal of Agricultural Food Chemistry, 1987, vol. 35, No. 1, pp. 14-18.
Evans, C.D., et al., "Odor and Flavor Responses to Additives in Edible Oils", Journal of the American Oil Chemists' Society, 1971, vol. 48, No. 9, pp. 495-498.

* cited by examiner

*Primary Examiner* — Michele L Jacobson
*Assistant Examiner* — Stephanie A Cox
(74) *Attorney, Agent, or Firm* — Curatolo Sidoti Co., LPA; Joseph G. Curatolo; Salvatore A. Sidoti

(57) ABSTRACT

A method of enhancing the aroma of an aroma composition, including the addition to the composition of an aroma-enhancing quantity of 2,4-nonadiene. The addition enhances the "radiance" of aroma compositions, especially foodstuffs, resulting in a stronger aroma and the need for reduced quantities of additional aroma ingredients.

22 Claims, No Drawings

AROMA COMPOSITION INCLUDING 2,4-NONADIENE

CROSS REFERENCE TO RELATED APPLICATIONS

The present application is a Continuation-in-Part of international patent application PCT/EP2011/063439 filed Aug. 4, 2011, which claims priority from British Patent Application GB 1013087.0 filed Aug. 4, 2010, from which applications priority is claimed, and which are incorporated by reference herein.

This disclosure relates to aroma enhancement of compositions in which aroma is an important factor.

A desirable aroma is a feature of many compositions. Such compositions include not only those to which perfume is normally added, such as cleaning compositions (soaps, washing detergents and other cleaning compositions, fabric softeners) and cosmetics, but also in edible compositions such as foodstuffs and beverages, in which the taste is actually at least partially caused by the aroma of the foodstuff or beverage. This is inhaled through the nose when the foodstuff or beverage is in the proximity of the consumer and the sensations triggered by the receipt of aroma molecules by the receptors in the nose complement those of the receptors on the tongue as the edible composition is tasted. All of these compositions shall hereinafter be referred to as "aroma compositions".

It has been observed that the addition of certain substances to aroma compositions enhances the perception of the aroma and thus causes a greater pleasurable sensation than would be the case for the same aroma composition without the substances. This is sometimes referred to as "enhanced radiance".

It has now been found that the addition of 2,4-nonadiene gives such an effect. There is therefore provided a method of enhancing the aroma of an aroma composition, comprising the addition to the composition of an aroma-enhancing quantity of 2,4-nonadiene.

There is additionally provided an aroma-providing composition, comprising at least one aroma ingredient and 2,4-nonadiene.

There is further provided an aroma composition comprising an aroma-enhancing proportion of 2,4-nonadiene.

2,4-nonadiene is a compound of the formula:

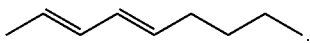

It occurs in nature and is currently used in the creation and manufacture of flavour concentrates. However, it is not considered to be a flavourant in its own right, so it is surprising that it has any effect at all, never mind the considerable aroma-enhancing properties that are the subject of this disclosure. A further surprising effect is that the addition of 2,4-nonadiene will enhance the aroma of a wide variety of compositions, invoking a much stronger aroma sensation in a consumer. A much smaller proportion of the aroma material will be needed to produce the same effect.

The proportion of 2,4-nonadiene required will depend on the aroma composition concerned and the nature and extent of the effect required, and the skilled perfumer or flavourist will readily be able to deduce a suitable proportion for every use. However, as a rough guide, the proportion may be between 1 ppb and 10 ppm, particularly between 100 ppb and 1 ppm. 2,4-nonadiene may be added directly to an aroma composition, or it may form part of an aroma-producing composition, that is, a composition whose function is solely to provide aroma. Such a composition comprises typically at least one aroma ingredient and 2,4-nonadiene. The additives and ancillary materials normally found in such compositions, such as solvents, thickeners, surfactants and the like, may also be included in art-recognised proportions.

The range of aroma compositions in which 2,4-nonadiene may be used is very wide. Non-limiting examples in the fragrance field include any use in which the presence of fragrant substances is required. These range from fine fragrances for personal use to fragrances added to commercial, cosmetic, personal and household products, such as creams and lotions, soaps and shampoos, detergent powders, fabric softeners, surface cleaners and the like.

Non-limiting examples in the flavours field include a wide variety of consumable products. By "consumable products" is meant any product that is taken by mouth, for spitting out (such as toothpaste or mouthwash) or ingestion (such as foodstuffs and beverages). Non-limiting examples include the following:

Food products, food additives, nutraceuticals, pharmaceuticals and any product placed in the mouth including chewing gum, oral care products, and oral hygiene products including but not limited to, cereal products, rice products, tapioca products, sago products, baker's products, biscuit products, pastry products, bread products, wafers, confectionery products, dessert products, gums, chewing gums, flavored or flavor-coated straws, flavor or flavor-coated food/beverage containers, chocolates, ices, honey products, treacle products, yeast products, baking-powder, salt and spice products, savoury products, soups, mustard products, vinegar products, sauces (condiments), tobacco products, cigars, cigarettes, processed foods, cooked fruits and vegetable products, meat and meat products, jellies, jams, fruit sauces, egg products, milk and dairy products, yoghurts, cheese products, butter and butter substitute products, milk substitute products, soy products, edible oils and fat products, medicaments, beverages, carbonated beverages, alcoholic drinks such as beers, wines and spirits, non-alcoholic drinks such as soft drinks, mineral and aerated waters, fruit drinks, fruit juices, coffee, artificial coffee, tea, cocoa, including forms requiring reconstitution including, without limitation, beverage powder, milk based beverage powder, sugar-free beverage powder, beverage syrup, beverage concentrate, instant coffee, instant tea, instant cocoa, and coffee whitener, food extracts, plant extracts, meat extracts, condiments, gelatins, pharmaceutical and non-pharmaceutical gums, tablets, lozenges, drops, emulsions, elixirs, syrups and other preparations for making beverages, and combinations thereof.

Oral care products, including, but not limited to, any composition applied to the oral cavity for the purposes of cleaning, freshening, healing, deodorising the cavity or any part thereof, may include, but are not limited to, toothpastes, tooth gels, tooth powders, tooth whitening products, mouthwashes, lozenges, dental floss, toothpicks, anti-plaque and anti-gingivitis compositions, throat lozenges, throat drops, inflammatory compositions, compositions for treatment of nasal symptoms, cold symptoms and upper gastrointestinal tract distress, compositions for cold relief, for alleviating discomfort of hot flash, and gargle compositions.

Thus, there is provided an aroma composition comprising an aroma-enhancing proportion of 2,4-nonadiene, and typical base components of the respective composition or product.

The disclosure is further described with reference to the following worked examples, which depict particular embodiments and which are not intended to be in any way limiting.

A chicken flavour was prepared according to the following formula.

| | |
|---|---|
| Decadienal-2,4 | 4 |
| Methyl-2 Mercapto-3 Tetrahydrofuran | 0.5 |
| Methyl-2 Furanthiol-3 | 0.6 |
| Furfuryl Mercaptan | 0.02 |
| Methional | 0.6 |
| Trimethyl-2,3,5 Pyrazine | 5 |
| Hexanal | 0.1 |
| Sulfurol | 20 |
| Methyl-2 keto-3 Tetrahydrothiophene | 0.3 |
| Ethanol | 968.88 |
| Total | 1000 |

The chicken flavour sample was taken and used as a control (hereinafter referred to as Sample 1). To a further sample, 2,4-nonadiene was added at a rate of 0.001% by weight replacing an equivalent amount of ethanol. Thus latter sample was referred to as Sample 2.

The samples were placed in separate aroma booths, that is, climate controlled cabins of approximately 2 $m^3$, equipped with a window, adapted to be briefly opened for the purposes of evaluation.

A blind pair comparison test was conducted on the aroma strength. The pair comparison was preceded by a warm-up test where the panellist was invited to smell a room in which the sample 1 was placed.

In order to reach room aroma filling equilibrium, samples were left exactly 15 minutes before the evaluation. For each panellist, the time was precisely the same. In order to maximise precision, panellists were unable to retest. This avoided aroma loss in the rooms during the completion of the test.

The pair comparison was completed as follows: Sample 1 vs. Sample 2, n=41 semi-naive evaluators (non sensory-trained evaluators but used to taste and smell flavours). Over the 41 panellists, 7 considered sample 1 as stronger while 34 considered sample 2 as stronger in aroma.

Significance of the differences between the two samples/rooms was calculated using binomial statistical tests. Results show also that in the room containing the sample 2, the overall aroma intensity is significantly higher ($p<0.001$) than in the room containing sample 1 (identical flavour without the aroma enhancing compound).

The conclusion is that the aroma-enhancing compound including added to a chicken flavour increases significantly the overall aroma intensity perceived in a room containing that chicken flavour. Therefore the component significantly increases the "radiance" of the chicken flavour.

The invention claimed is:

1. A method of enhancing the aroma of a non-consumable aroma composition comprising fragrant materials, comprising the addition to the composition of an aroma-enhancing quantity of 2,4-nonadiene, in which the 2,4-nonadiene is present in the composition in a concentration of from 1 ppb to 10 ppm.

2. A method according to claim 1, in which the 2,4-nonadiene is present in the composition in a concentration of from 100 ppb to 1 ppm.

3. The method according to claim 1, wherein the aroma composition is added to a fine fragrance.

4. The method according to claim 1, wherein the aroma composition is added to a commercial, cosmetic, personal or household product, which is not a consumable product, optionally wherein the product is a cream, lotion, soap, shampoo, detergent powder, fabric softener, or surface cleaner.

5. A non-consumable aroma-providing composition comprising fragrant materials and an aroma-enhancing quantity of 2,4-nonadiene, in which the 2,4-nonadiene is present in the composition in a concentration of from 1 ppb to 10 ppm.

6. The aroma-providing composition according to claim 5, wherein the aroma-providing composition further comprises the base components of a fine fragrance.

7. The aroma-providing composition according to claim 5, wherein the aroma-providing composition further comprises the base components of a commercial, cosmetic, personal or household product, which is not a consumable product, optionally wherein the product is a cream, lotion, soap, shampoo, detergent powder, fabric softener, or surface cleaner.

8. A composition according to claim 5, in which the 2,4-nonadiene is present in the composition in a concentration of from 100 ppb to 1 ppm.

9. An aroma-enhancing composition comprised in a consumable composition, comprising base components of the consumable composition, at least one aroma ingredient and an aroma-enhancing quantity of 2,4-nonadiene, in which the 2,4-nonadiene is present in the composition in a concentration of from 1 ppb to 10 ppm.

10. A composition according to claim 9, in which the 2,4-nonadiene is present in the composition in a concentration of from 100 ppb to 1 ppm.

11. An aroma-enhancing composition according to claim 9, wherein the consumable composition comprises the base components of an oral care product or an oral hygiene product.

12. An aroma-enhancing composition according to claim 9, wherein the consumable composition comprises the base components of a beverage.

13. An aroma-enhancing composition according to claim 9, wherein the consumable composition further the base components of chewing gum.

14. An aroma-enhancing composition according to claim 9, wherein the consumable composition comprises the base components of a cigar, cigarette or tobacco product.

15. An aroma-enhancing composition according to claim 9, wherein the consumable composition comprises the base components of a pharmaceutical or a nutraceutical.

16. A method of enhancing the aroma of an aroma composition in a consumable composition comprising base components of the consumable composition, the method comprising the addition to the consumable composition of an aroma-enhancing quantity of 2,4-nonadiene, in which the 2,4-nonadiene is present in the composition in a concentration of from 1 ppb to 10 ppm.

17. The method according to claim 16, in which the 2,4-nonadiene is present in the composition in a concentration of from 100 ppb to 1 ppm.

18. The method according to claim 16, wherein the consumable composition further comprises the base components of an oral care product or an oral hygiene product.

19. The method according to claim 16, wherein the consumable composition further comprises the base components of a beverage.

20. The method according to claim 16, wherein the consumable composition further comprises the base components of chewing gum.

21. The method according to claim 16, wherein the consumable composition further comprises the base components of a cigar, cigarette or tobacco product.

22. The method according to claim 16, wherein the consumable composition further comprises the base components of a pharmaceutical or a nutraceutical.

* * * * *